Feb. 18, 1936.      H. T. KRAFT      2,031,418
APPARATUS FOR MAKING CONTAINERS
Filed Nov. 19, 1934      5 Sheets-Sheet 2

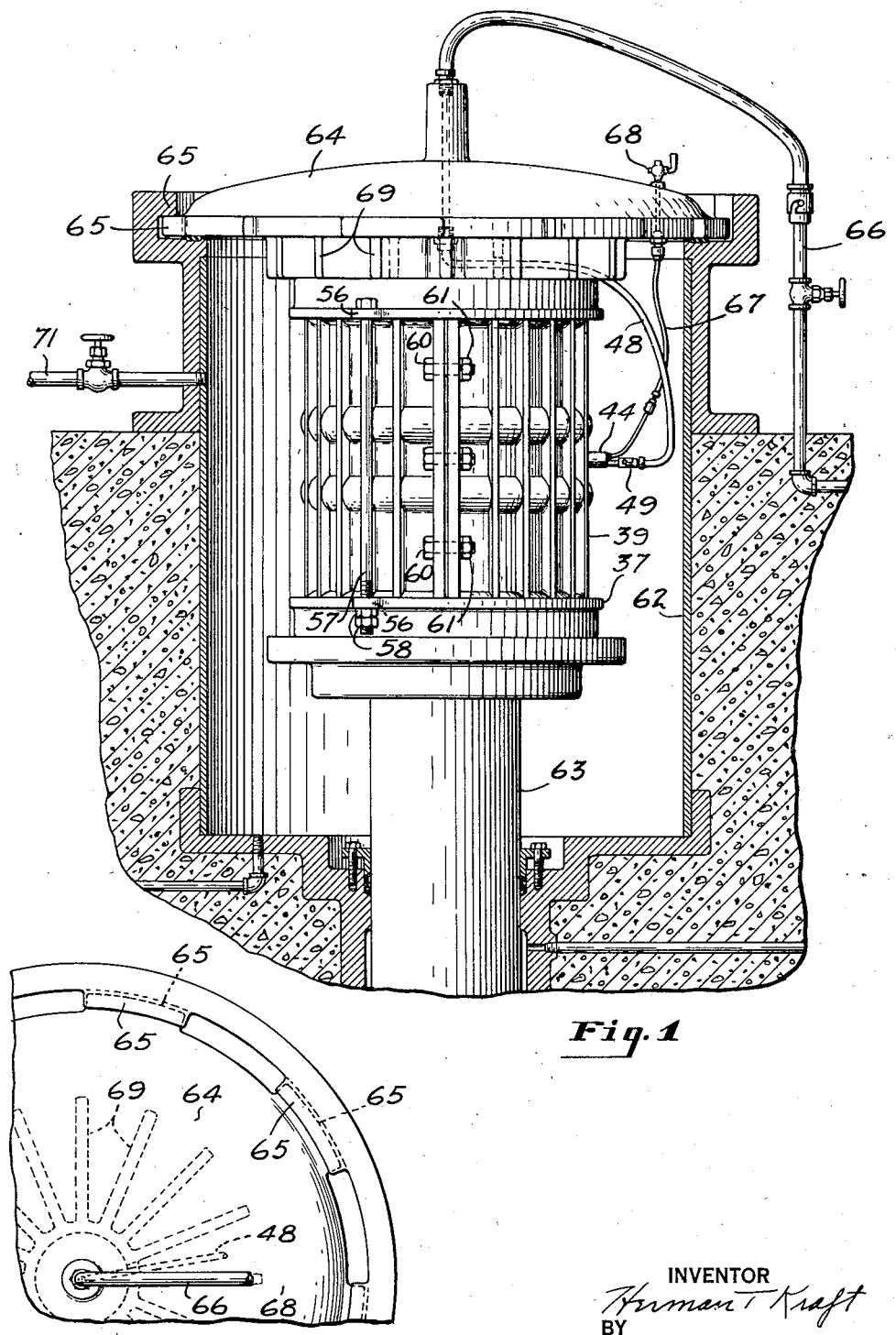

INVENTOR
Herman T. Kraft
BY
Evans & McCoy
ATTORNEYS

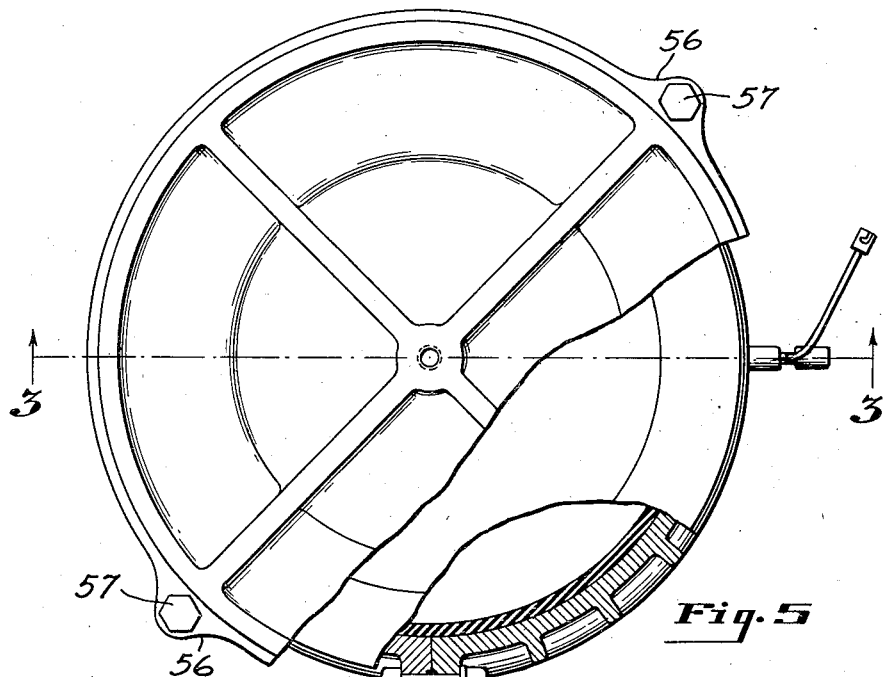
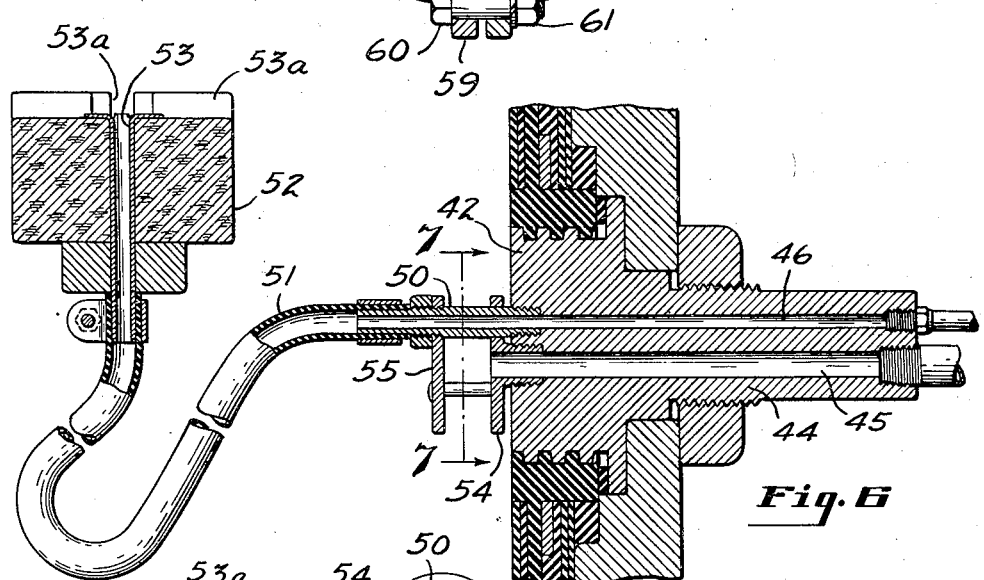
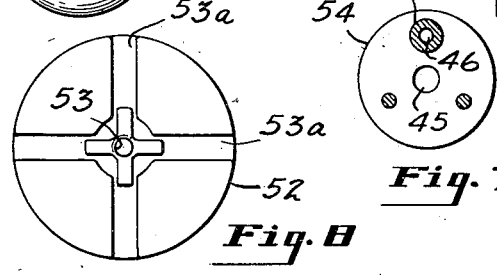

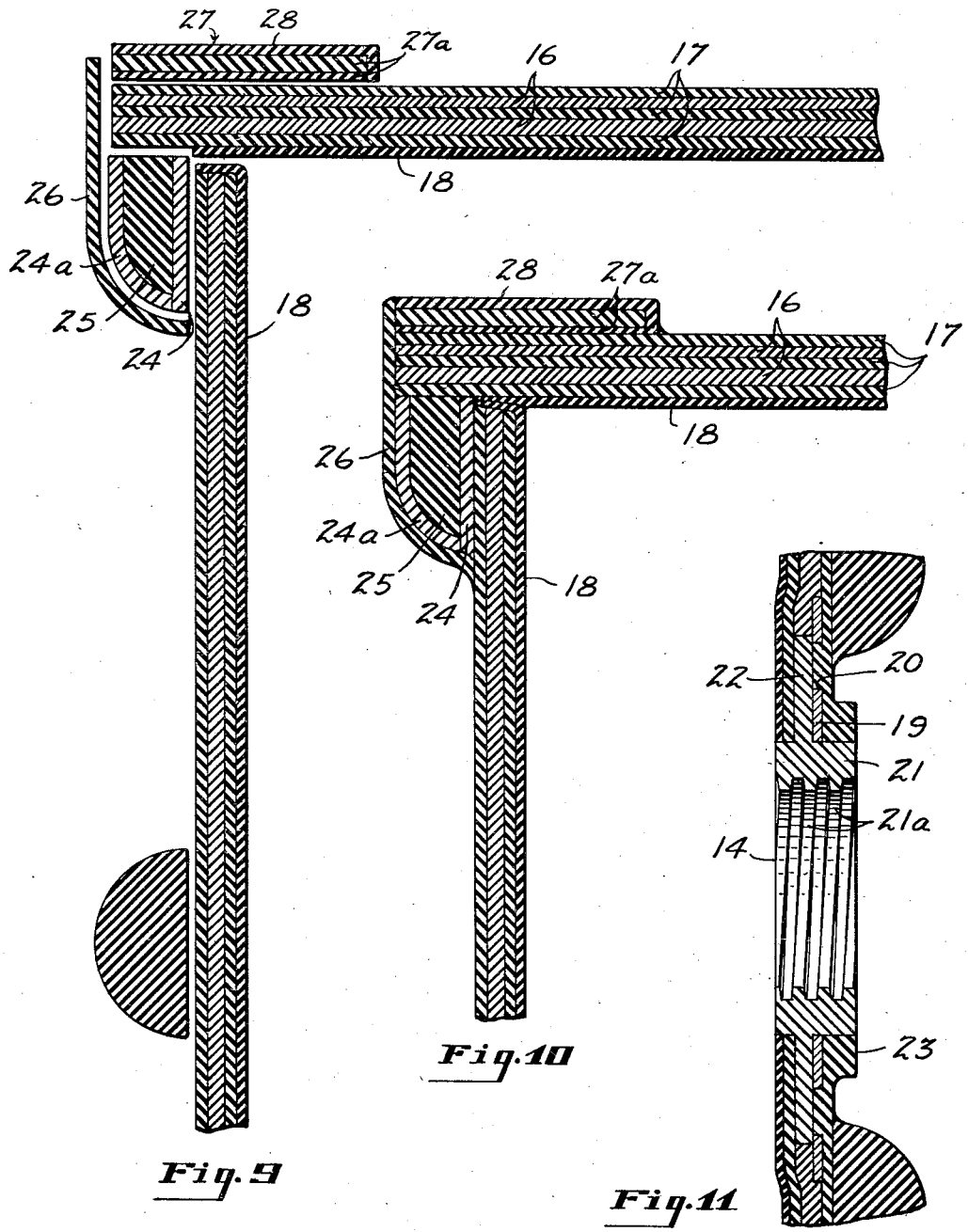

Feb. 18, 1936. H. T. KRAFT 2,031,418
APPARATUS FOR MAKING CONTAINERS
Filed Nov. 19, 1934 5 Sheets-Sheet 5
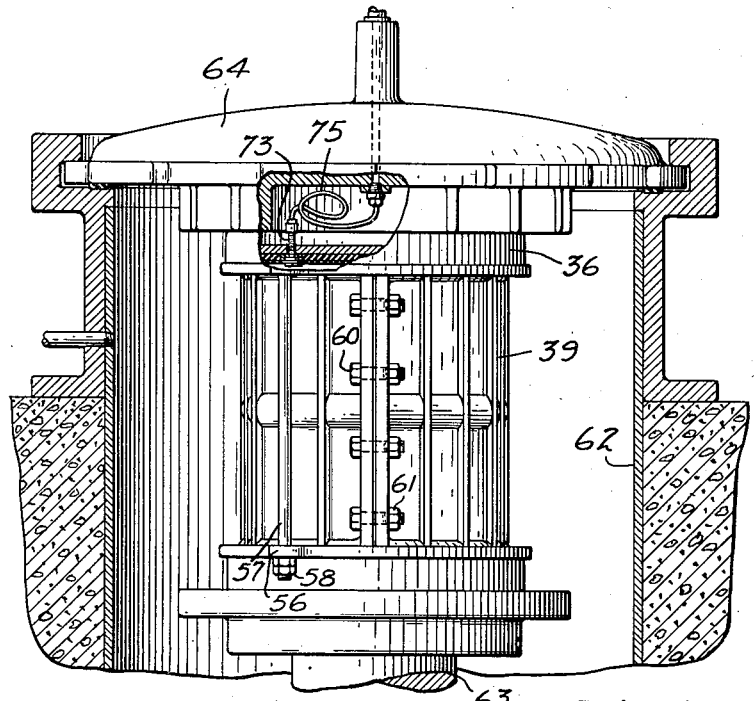
Fig.12
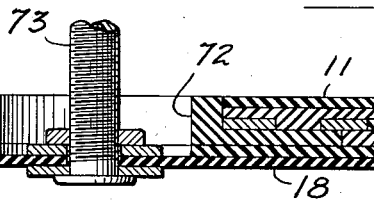
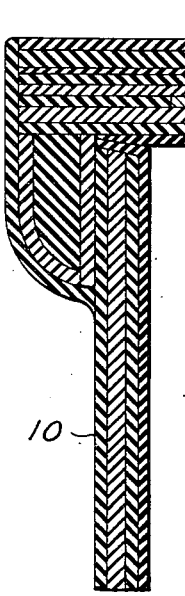
Fig.13
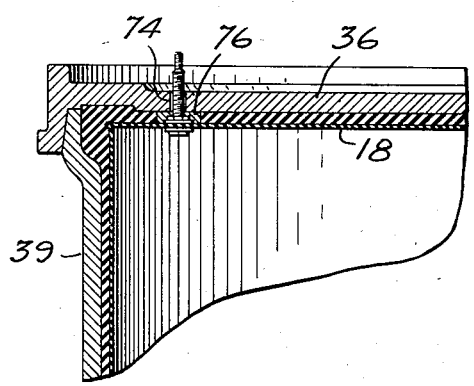
Fig.14
INVENTOR
Herman T. Kraft
BY
Evans & McCoy
ATTORNEYS Patented Feb. 18, 1936

2,031,418

UNITED STATES PATENT OFFICE 2,031,418

APPARATUS FOR MAKING CONTAINERS

Herman T. Kraft, Akron, Ohio, assignor to The General Tire & Rubber Company, Akron, Ohio, a corporation of Ohio Application November 19, 1934, Serial No. 753,720

17 Claims. (Cl. 18—17)

This invention relates to apparatus for making lined, non-metallic containers of the general character shown in my co-pending application Serial No. 705,525 filed January 6, 1934.

One of the objects of the present invention is to provide new and improved apparatus for use in the manufacture of non-metallic vulcanizable containers.

Another object is to provide apparatus for use in the manufacture of non-metallic containers in which means is provided for placing the container under a substantial axial compression during the vulcanizing operation.

A further object is to provide apparatus for manufacturing non-metallic containers, having new and improved means for admitting fluid into the container during the vulcanizing operation.

With the above and other objects in view, the present invention consists in certain steps in the method of making the containers, certain features of construction and combinations of parts to be hereinafter described with reference to the accompanying drawings and then claimed.

In the drawings:

Figure 1 is a section through the heater showing the mold in position;

Fig. 2 is a fragmentary plan view of the heater showing the bayonet lock for locking the heater cover in position;

Fig. 5 is a plan view of the mold, a portion of the same being shown in section;

Fig. 6 is an enlarged sectional view showing the device for admitting liquid into the mold for use in the molding operation;

Fig. 7 is a section taken approximately on the line 7—7 of Fig. 6;

Fig. 8 is a plan view of the float shown in Fig. 6;

Fig. 9 is a fragmentary section showing the arrangement of the parts of the container prior to their assembly into the mold parts;

Fig. 10 is an enlarged fragmentary section of the container after the pressing operation and prior to the vulcanization of the same;

Fig. 11 is an enlarged fragmentary section through the closure plug opening;

Fig. 12 is a fragmentary view similar to Fig. 1, showing the connections for a container which is to be inflated with gas under pressure during the vulcanizing operation;

Fig. 13 is an enlarged sectional view showing the gas admission device arranged on the inner lining of the container;

Fig. 14 is a sectional view of the mold showing the vulcanized container therein and showing the device for admitting gas into the container.

Referring to the accompanying drawings in which like numerals refer to like parts throughout the several views, the container to be produced in accordance with the present invention is of the general character shown and described in my co-pending applications Serial No. 705,525, filed January 6, 1934, and Serial No. 753,719, filed November 19, 1934, and the method employed is the method described in said co-pending applications and in my co-pending applications Serial No. 718,974, filed April 4, 1934, and Serial No. 753,721, filed November 19, 1934.

Figure 4:
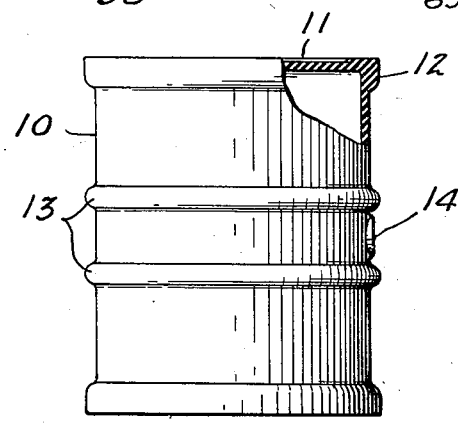
Fig. 4 is a side elevation of a completed container, a portion thereof being shown in section.

The container as shown in Figs. 4, 10 and 11, is a one-piece structure having a cylindrical body portion 10 and end portions 11, the body portion having integral end chimes 12 and integral intermediate chimes 13, and a filler opening 14. The end and body portions are of laminated structure, and each is formed from a sheet comprised of several layers of material. In the construction shown, alternate layers 16 and 17 respectively, of hard rubber such as "nail stock" and soft rubber are employed. Although any suitable fibrous or other vulcanizable non-metallic material may be utilized, I prefer to use rubber fibres for the layers 17 such as the clippings and cuttings from rubberized fabric stock used in the manufacture of pneumatic tires. These clippings and cuttings are preferably ground into fine particles and then run through a calendar mill to produce sheets of rubberized fabric, the mill during the sheet forming operation tends to form a grain in the sheets ultimately produced. Two such sheets with the grains at an angle to each other are preferably employed in the innermost layer 17 as shown in Fig. 9. The outer layer 17 may comprise one or more of such sheets as desired.

Interposed between the inner, intermediate and outer layers 17 are the layers 16 of a nail stock material. The layers 16 of nail stock, however, may be omitted if desired.

The inner surfaces of the sheets comprising the end and body portions are faced with a lining 18 of acid resistant rubber such as gum rubber which is securely stitched to the sheets. Since gum rubber is not highly resistant to the action of some acids, the facing or lining 18 may be of a hard rubber of the character known as "ebonite". The lining 18 of the body portion is formed over the ends of the body portion 10 as indicated in Fig. 9 and the lining for the end portions is arranged to overlap with these latter portions of the lining 18 of the body portion.

The cylindrical body 10 is preferably built up on a cylindrical drum so as to provide for the staggering of the meeting ends of the various layers of material.

In forming the body portion 10, an annular metal plate 19 is arranged between the layers of material to surround the filler opening 14, apertures 20 being arranged in the plate 19 to provide for the union of the material through the plate 19. A suitable hard rubber ring 21 is also arranged within the filler opening 14 and is provided with a circumferential flange 22 disposed between adjacent layers of the sheet material. The filler opening is also further built up externally by a ring 23 of rubber as shown in Fig. 11. The ring 21 is also provided with internal threads 21a for a purpose to be later described.

The chimes 12, as shown in Figs. 9 and 10, are preferably built up of a strip 24 of the fibrous material disposed adjacent the body portion 10 and a preformed body 25 of soft rubber which is disposed on the strip 24 and adjacent the projecting circumferential portion of the end portion 11, and which is preferably covered with fibrous material 24a. Finishing strips 26 of rubber are also disposed to cover the chime body 25 and the circumferential faces of the end portions 11. The end portions are also preferably provided with an annular ring 27 comprised of layers 27a of the fibre stock or "nail stock" and a surface 28 also of rubber, as shown in Figs. 9 and 10.

The chimes 13 are in the form of rings of preformed stock.

Figure 3:
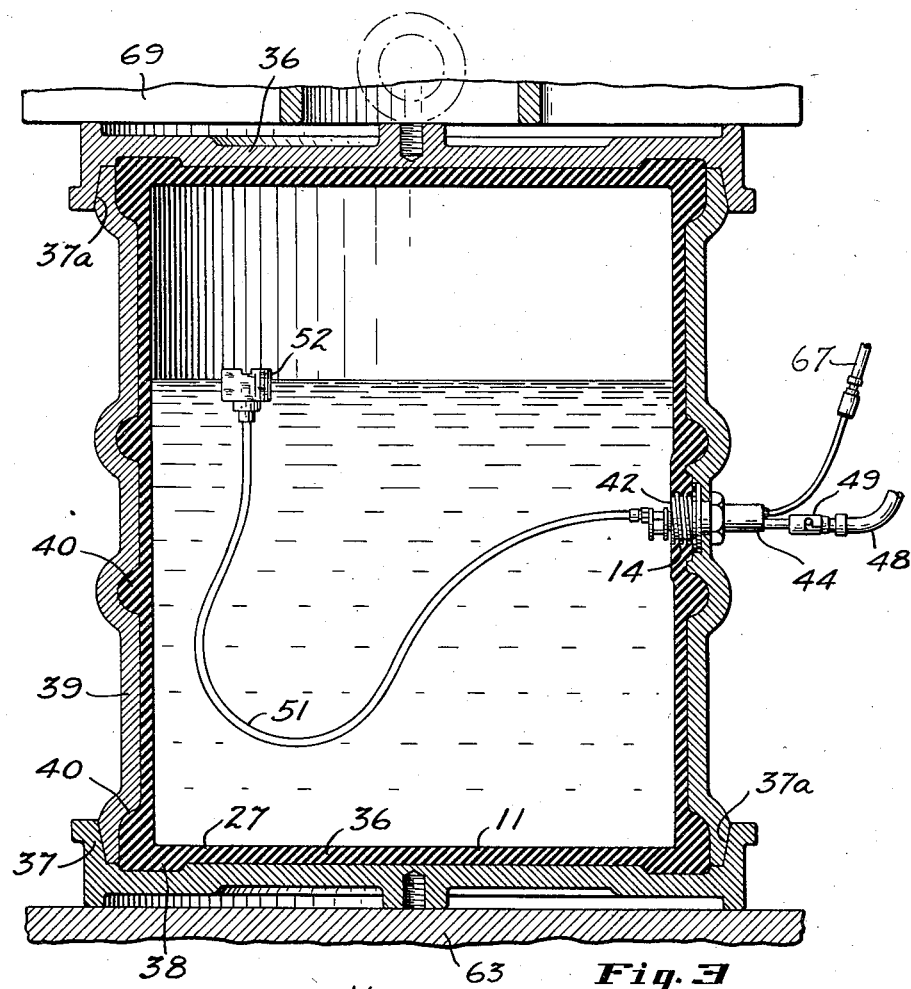
Fig. 3 is an enlarged vertical section through the mold parts showing the container therein.

The mold proper, as shown in Figs. 3 and 5, comprises head parts 36 having circumferential flanges 37, the inner faces 37a of which are inclined radially and axially outwardly from the head part. These head parts are also formed with annular recesses 38 for the reception of the annular end rings 27.

The mold also includes a pair of mating semicircular body parts 39 each having chime receiving recesses 40. The ends of the body parts 39 are tapered to engage with the inclined face of the flanges 37 of the head parts 36. An opening 41 is also provided in one of the body parts 39 to be positioned in alignment with the filler opening 14.

This particular body part receives the filler device which comprises a member 42 threaded into the filler opening and having a portion 44 extending through opening 41, a nut 43 being provided for the portion 44. The member 42, as shown in Fig. 6, has an inlet passage 45 and an outlet passage 46 extending therethrough. The outlet passage 46 is in communication with a hose connection 47 and the outer end of the inlet passage is also in communication with a flexible tube 48 through the medium of a suitable connector 49. The inner end of the outlet passage 46 is provided with a connection 50 which carries a flexible hose 51 having at its outer end a float 52 of cork or other suitable material. The float is provided with a tubular core 53 to which the hose 51 is secured. The top of the float, as shown in Figs. 6 and 8, is preferably provided with a number of projections 53a. The float, furthermore, is of such diameter that it may be inserted through the filler opening 14. The inner end of the inlet passage 45 is provided with a member 54 which is threaded into the block portion 42 and which is connected with the inlet connection 50. The member 54 is provided with a plate 55 disposed in front of the inlet passage 45 to act as a deflector for the fluid to be introduced into the container.

The length of the assembled container parts is made to be materially greater than the distance between the mold head parts 36 when in their closed position.

The float 52 is placed within the container filler opening and the member 42 is threaded into the filler opening ring 21 and the mold body members 39 are placed about the assembled container and securely clamped about the same by means of bolts 60 extending through lugs 59 on the sides of the members 39, nuts 61 being provided to clamp the body parts 39 together about the container body.

The nut 43 is then threaded on part 44 to clamp the member 42 in position.

The one end 11 of the container is positioned within the bottom mold head 36 and the clamped container body 10 is then positioned over the said end 11, after which the top end 11 is placed in position over the container end 11 and the other mold head 36 is placed over the body parts 39. At this stage, the ends of the body parts are just received within the flanges, since as previously set forth the assembled container is of greater length than the distance between the head parts or rather the length of the mold cavity.

The mold head parts 36 are provided with aligned, outwardly extending lugs 56 at their opposite sides to receive clamping bolts 57, which are provided with nuts 58. The nuts 58 are threaded on the bolts 57 and the threading of these nuts causes the mold parts to move inwardly toward each other a substantial distance until they engage with the end faces of the body parts of the mold, the inclined faces of the flanges 37 and the ends of the body parts 39 closely contacting each other. This axial movement of the head parts toward each other axially compresses the container body portion to subject the same to a substantial axial pressure, and firmly engages the head portions 10 thereof, placing the overlapped portions of the lining material 18 under a substantial pressure at the ends of the body portion 10. The clamped mold parts completely enclose the container. The mold is next placed within a pot heater 62 which is provided with an axially movable plunger 63, the mold being seated on this plunger. The cover 64 of the heater is then placed in position and clamped by means of portions 65 forming a bayonet lock. During this procedure the inlet connection 49 is connected with the inlet tube 48 which extends through the cover, as indicated in Fig. 1, and which is connected with a supply pipe 66. Also, before the cover 64 is locked in position the inlet tube 47 is connected with a tube 67 also extending through the cover 64 and which is provided with a release valve 68.

The inner face of the cover 64 is formed with a series of radial webs or fins 69 as shown in Fig. 1.

The plunger 63 is then next raised through the medium of hydraulic pressure until the top of the mold is engaged with the fins 69, sufficient pressure being employed through the plunger 63 to securely clamp the mold between the cover and the plunger 63.

Hot water is then introduced from the supply pipe 66 through the inlet tube 48 and inlet passageway 45 into the container which is confined within the heater. The float 52 is supported by the rising liquid and by reason of the tubular sleeve 53 which opens through the top thereof, the air within the container exhausts through the hose 51, outlet passage 46 and outlet tube 67 through the exhaust valve 68. When the container is completely filled with water and the air completely exhausted, the exhaust valve 68 is closed and the water is then placed under a substantial pressure to insure contact of all external parts of the container with the surrounding mold parts, and also to subject the container to a substantial internal pressure. Steam is then introduced through the conduit 70 into the pot heater. The mold is left within the pot heater a sufficient length of time to cause complete vulcanization of the container, and then removed and opened by removing the nuts 58 and 61 and bolts 57 and 60. The resulting container is a one-piece construction in which the end and body parts together with the inner facings thereof are integrally united.

In Figs. 12, 13, and 14, I have shown a modification in which the filler opening 72 for the container is arranged in one of the ends 11. Apart from the position of the filler opening, the container is of substantially the same construction as the container shown in Figs. 4, 9 and 10.

In this modification, the lining 18 for the closed end portion 11, which contains the filler opening 72, extends across the filler opening 72, as indicated in Fig. 13, and an inlet valve 73 of suitable construction is arranged in the body of rubber which bridges the filler opening 72. The mold parts 36 and 39 are of the same general construction as the corresponding parts shown in Fig. 3, with the exception that an aperture 74 of slightly larger diameter than the valve 73 is arranged in the upper or head part 36 as the mold shown in Fig. 14. After the heater with the container arranged therein is placed within the pot heater 62, but prior to the time that the cover 64 is positioned, a suitable inlet hose 75 which extends through the cover 64 is connected with the valve 73. Also, a closure plug 76 is arranged in the filler opening 72 to prevent outward movement of the portion of the lining 18 which spans the filler opening 72, when the container is subjected to an internal pressure. After the cover 64 is locked in place on the heater, a fluid such as $CO_2$ gas is introduced into the container through the hose 75 and valve 73 to subject the container to a substantial internal pressure during the vulcanizing operation.

It has been found that by subjecting the body portion of the container to a substantial axial pressure during the vulcanizing operation, a superior product can be produced.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In apparatus for producing non-metallic vulcanizable one-piece containers, a pair of semi-circular mold body parts, means for clamping said parts about a cylindrical container, a pair of mold head parts, and means to draw said head parts toward each other to axially compress the container and to clamp the head parts securely against the ends of the body parts, whereby to completely seal the container within the same.

2. In apparatus for producing non-metallic vulcanizable one-piece containers, a pair of semi-circular mold body parts, means for clamping said parts about a cylindrical container, a pair of mold head parts, and means to draw said head parts toward each other to axially compress the container and to clamp the head parts securely against the ends of the body parts, whereby to completely seal the container within the same, said head parts each having a peripheral flange disposed to surround the adjacent ends of said body parts when said mold is in clamped position.

3. In apparatus for producing non-metallic vulcanizable one-piece containers, a pair of semi-circular mold body parts, means for clamping said parts about a cylindrical container, a pair of mold head parts, and means to draw said head parts towards each other to axially compress the container and to clamp the head parts securely against the ends of the body parts, whereby to completely seal the container within the same, said head parts each having a peripheral flange disposed to surround the adjacent ends of said body parts in contacting engagement when said mold is in clamped position.

4. In apparatus for producing non-metallic vulcanizable one-piece containers, a pair of semi-circular mold body parts, means for clamping said parts about a cylindrical container, a pair of mold head parts, and means to draw said head parts toward each other to axially compress the container and to clamp the head parts securely against the ends of the body parts, whereby to completely seal the container within the same, said head parts each having a peripheral flange disposed to surround the adjacent ends of said body parts when said mold is in clamped position, the flange having a tapered inner face and the adjacent ends of said body parts having a corresponding tapered surface for substantially continuous engagement with said face.

5. In apparatus for producing non-metallic containers of vulcanizable material, the combination with a mold for enclosing a container, of a heater having a chamber for receiving said mold, and means for exhausting air from and introducing fluid into the container through said mold, said means comprising a member extendible through said heater into the interior of the container and having an inlet passage and an outlet passage therethrough, a conduit communicating with said outlet passage and to the atmosphere externally of said heater, valve means for said conduit, a float positionable within the container, a conduit carried by said float and in communication with said outlet passage, a source of fluid supply externally of said heater, and conduit means connected with said inlet passage and being in communication through said heater with said source.

6. In apparatus for producing non-metallic containers of vulcanizable material, the combination with a mold for enclosing a container, of a heater having a chamber for receiving said mold, and means for exhausting air from and introducing fluid into the container through said mold, said means comprising a member extendible through said heater into the interior of the container and having an inlet passage and an outlet passage therethrough, a conduit communicating with said outlet passage and to the atmosphere externally of said heater, valve means for said conduit, a float positionable within the container, a conduit carried by said float and in communication with said outlet passage, a source of fluid supply externally of said heater, and conduit means connected with said inlet passage and being in communication through said heater with said source, said float having an opening therein opening through the top surface thereof, said float carried conduit being in communication with said last mentioned opening.

7. In apparatus for producing non-metallic containers of vulcanizable material, the combination with a mold for enclosing a container, of a heater having a chamber for receiving said mold, and means for exhausting air from and introducing fluid into the container through said mold, said means comprising a member extendible through said heater into the interior of the container and having an inlet passage and an outlet passage therethrough, a conduit communicating with said outlet passage and to the atmosphere externally of said heater, valve means for said conduit, a float positionable within the container, a conduit carried by said float and in communication with said outlet passage, a source of fluid supply externally of said heater, and conduit means connected with said inlet passage and being in communication through said heater with said source, said float having an opening therein opening through the top surface thereof, said float carried conduit being in communication with said last mentioned opening, said float having means for preventing closing of the opening through contact with the surface of the container.

8. In apparatus for producing non-metallic containers of vulcanizable material, the combination with a mold for enclosing a container, of a heater having a chamber for receiving said mold, and means for exhausting air from and introducing fluid into the container through said mold, said means comprising a member extendible through said heater into the interior of the container and having an inlet passage and an outlet passage therethrough, a conduit communicating with said outlet passage and to the atmosphere externally of said heater, valve means for said conduit, a float positionable within the container, a conduit carried by said float and in communication with said outlet passage, a source of fluid supply externally of said heater, and conduit means connected with said inlet passage and being in communication through said heater with said source, said member arranged to have a fluid-tight seal with the container.

9. In apparatus for producing non-metallic containers of vulcanizable material, the combination with a mold for enclosing a container, of a heater having a chamber for receiving said mold, and means for exhausting air from and introducing fluid into the container through said mold, said means comprising a member extendible through said heater into the interior of the container and having an inlet passage and an outlet passage therethrough, a conduit communicating with said outlet passage and to the atmosphere externally of said heater, valve means for said conduit, a float positionable within the container, a conduit carried by said float and in communication with said outlet passage, a source of fluid supply externally of said heater, and conduit means connected with said inlet passage and being in communication through said heater with said source, said member having threads thereon for threaded sealed engagement with the container.

10. In apparatus for producing non-metallic containers of vulcanizable material, the combination with a container enclosing mold, of a heater of the pot type having a chamber for receiving said mold, and means for introducing liquid into and exhausting air from the enclosed container, said means comprising a float insertable into the container through the container, a member extendible through said mold into the interior of the container and arranged to have sealed engagement with the container, said member having an inlet passage and an outlet passage extending therethrough, a flexible conduit carried by said float and in communication with said outlet passage, a second conduit in communication with said outlet passage and opening to the atmosphere through said heater, and means extending through said heater and communicating with said inlet passage for introducing liquid into the container, said float being supported by the rising liquid to permit air above the liquid to exhaust from within the container through said conduits and outlet passage.

11. In apparatus for producing non-metallic containers of vulcanizable material, the combination with a container enclosing mold, of a heater of the pot type having a chamber for receiving said mold, and means for introducing liquid into and exhausting air from the enclosed container, said means comprising a float insertable into the container through the container, a member extendible through said mold into the interior of the container and arranged to have sealed engagement with the container, said member having an inlet passage and an outlet passage extending therethrough, a flexible conduit carried by said float and in communication with said outlet passage, a second conduit in communication with said outlet passage and opening to the atmosphere through said heater, and means extending through said heater and communicating with said inlet passage for introducing liquid into the container, said float being supported by the rising liquid to permit air above the liquid to exhaust from within the container through said conduits and outlet passage, said means also including a shut-off valve for closing said second conduit upon complete exhaustion of air.

12. In apparatus for vulcanizing vulcanizable non-metallic one-piece containers, the combination with a container-enclosing mold, of means for introducing liquid into and exhausting air from the enclosed container, comprising a float positionable within the container through the same, a member extendible through the mold and container and having an inlet passage and an outlet passage, both passages opening into the interior of the container, a flexible conduit carried by said float and communicating with said outlet passage, and means external of said mold and in communication with said inlet passage for introducing liquid into the container, said float rising with the liquid whereby air within the container and above the liquid will exhaust through said conduit and outlet passage.

13. In apparatus for vulcanizing vulcanizable non-metallic one-piece containers, the combination with a container-enclosing mold, of means for introducing liquid into and exhausting air from the enclosed container, comprising a float positionable within the container through the same, a member extendible through the mold and container and having an inlet passage and an outlet passage, both passages opening into the interior of the container, a flexible conduit carried by said float and communicating with said outlet passage, and means external of said mold and in communication with said inlet passage for introducing liquid into the container, said float rising with the liquid whereby air within the container and above the liquid will exhaust through said conduit and outlet passage, said first means including a valve for closing said outlet passage upon complete exhaustion of air.

14. In apparatus for vulcanizing vulcanizable non-metallic one-piece containers, the combination with a container-enclosing mold, of means for introducing liquid into and exhausting air from the enclosed container, comprising a float positionable within the container through the same, a member extendible through the mold and container and having an inlet passage and an outlet passage, both passages opening into the interior of the container, a flexible conduit carried by said float and communicating with said outlet passage, and means external of said mold and in communication with said inlet passage for introducing liquid into the container, said float rising with the liquid whereby air within the container and above the liquid will exhaust through said conduit and outlet passage, said member having a deflecting member within the container in front of said inlet passage.

15. In apparatus for vulcanizing vulcanizable non-metallic one-piece containers, the combination with a container-enclosing mold, of means for introducing liquid into and exhausting air from the enclosed container, comprising a float positionable within the container through the same, a member extendible through the mold and container and having an inlet passage and an outlet passage, both passages opening into the interior of the container, a flexible conduit carried by said float and communicating with said outlet passage, and means external of said mold and in communication with said inlet passage for introducing liquid into the container, said float rising with the liquid whereby air within the container and above the liquid will exhaust through said conduit and outlet passage, said member being arranged to have threaded sealed engagement with the container.

16. In apparatus for vulcanizing vulcanizable non-metallic one-piece containers, the combination with a container-enclosing mold, of means for introducing liquid into and exhausting air from the enclosed container, comprising a float positionable within the container through the same, a member extendible through the mold and container and having an inlet passage and an outlet passage, both passages opening into the interior of the container, a flexible conduit carried by said float and communicating with said outlet passage, and means external of said mold and in communication with said inlet passage for introducing liquid into the container, said float rising with the liquid whereby air within the container and above the liquid will exhaust through said conduit and outlet passage, said float having a passage opening through its top surface and in communication with said conduit.

17. In apparatus for vulcanizing vulcanizable non-metallic one-piece containers, the combination with a container-enclosing mold, of means for introducing liquid into and exhausting air from the enclosed container, comprising a float positionable within the container through the same, a member extendible through the mold and container and having an inlet passage and an outlet passage, both passages opening into the interior of the container, a flexible conduit carried by said float and communicating with said outlet passage, and means external of said mold and in communication with said inlet passage for introducing liquid into the container, said float rising with the liquid whereby air within the container and above the liquid will exhaust through said conduit and outlet passage, said float having a passage opening through its top surface and in communication with said conduit, and also having means on its upper surface to prevent closing of its passage through contact with the interior of the container.

HERMAN T. KRAFT.